Dec. 10, 1963    L. TROY    3,113,800
AUTOMOBILE TRANSPORT
Filed Jan. 11, 1961    10 Sheets-Sheet 1
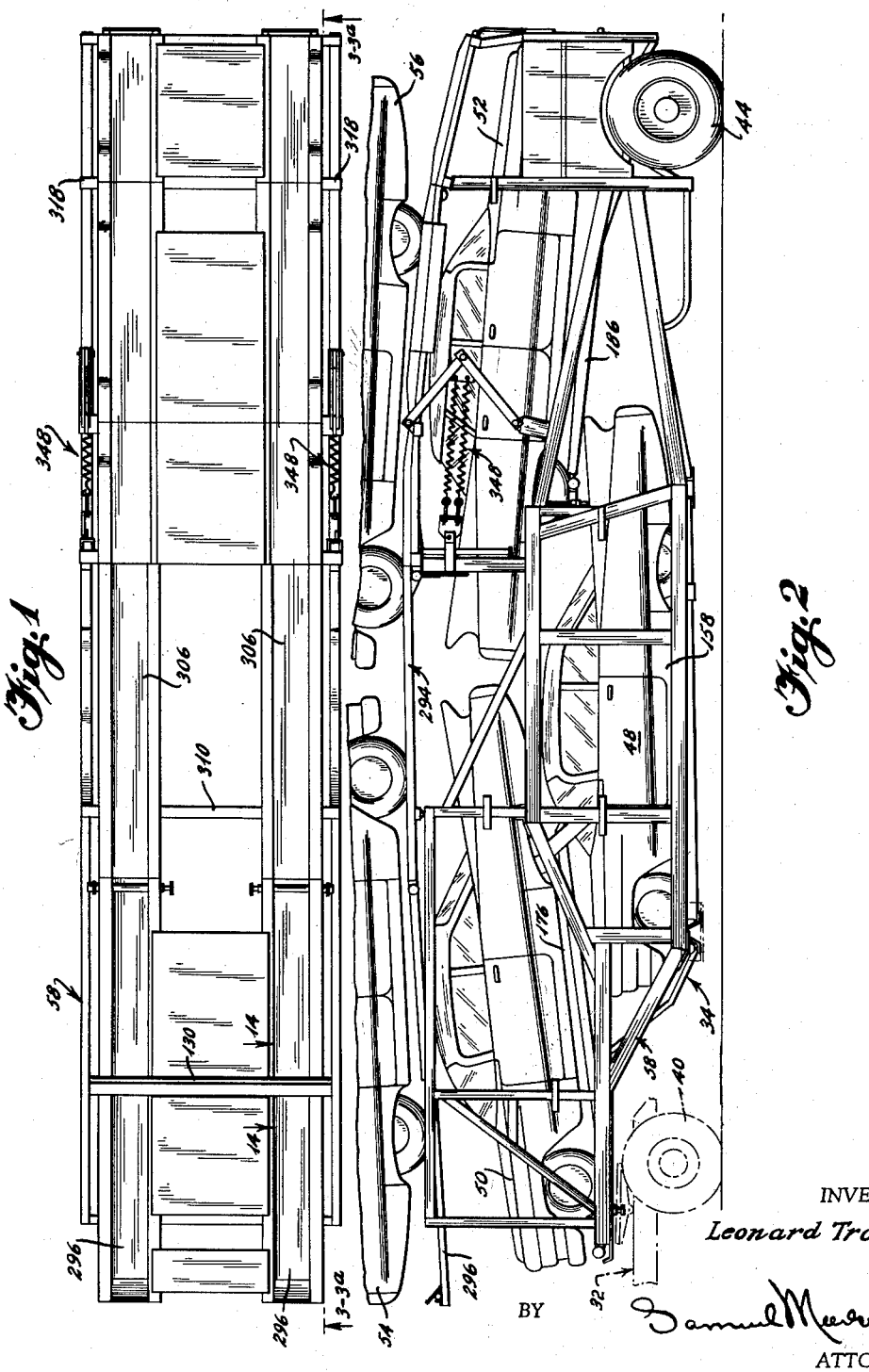
INVENTOR
Leonard Troy
BY Samuel Meerveld
ATTORNEY

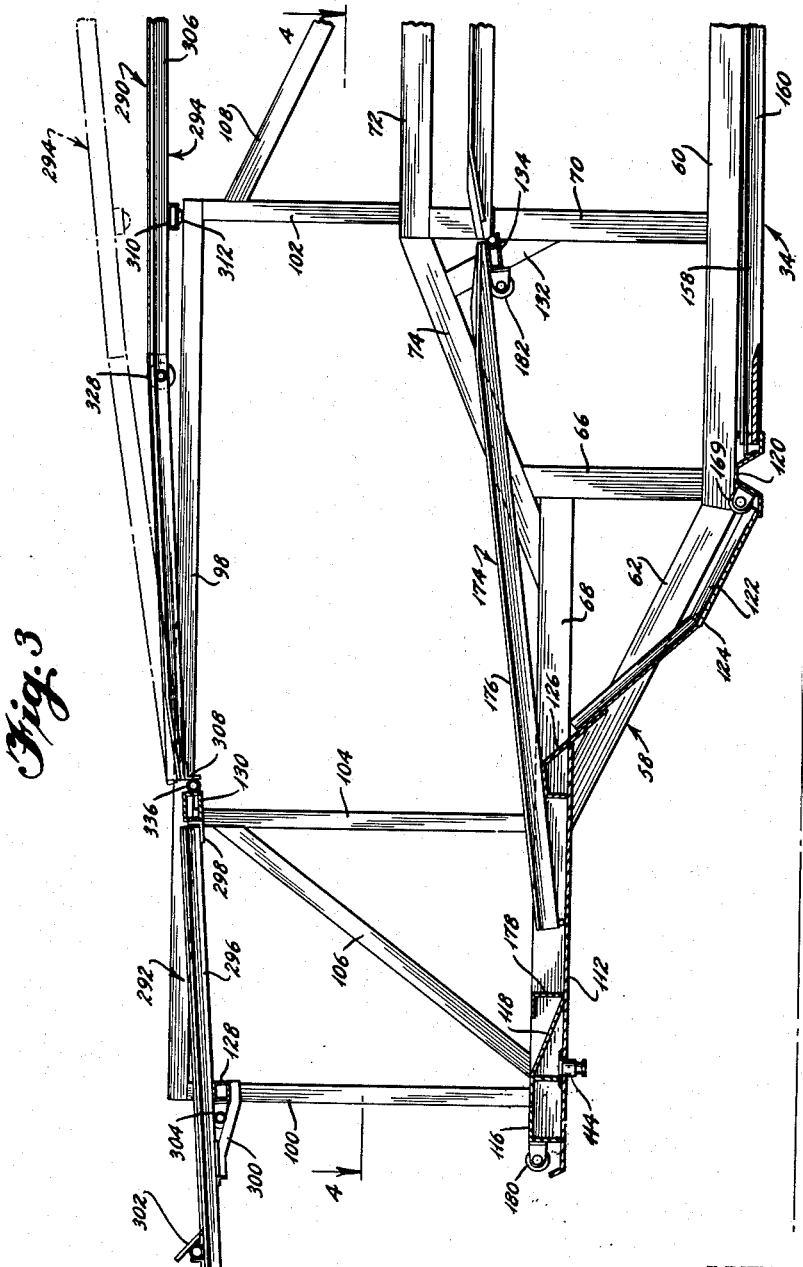

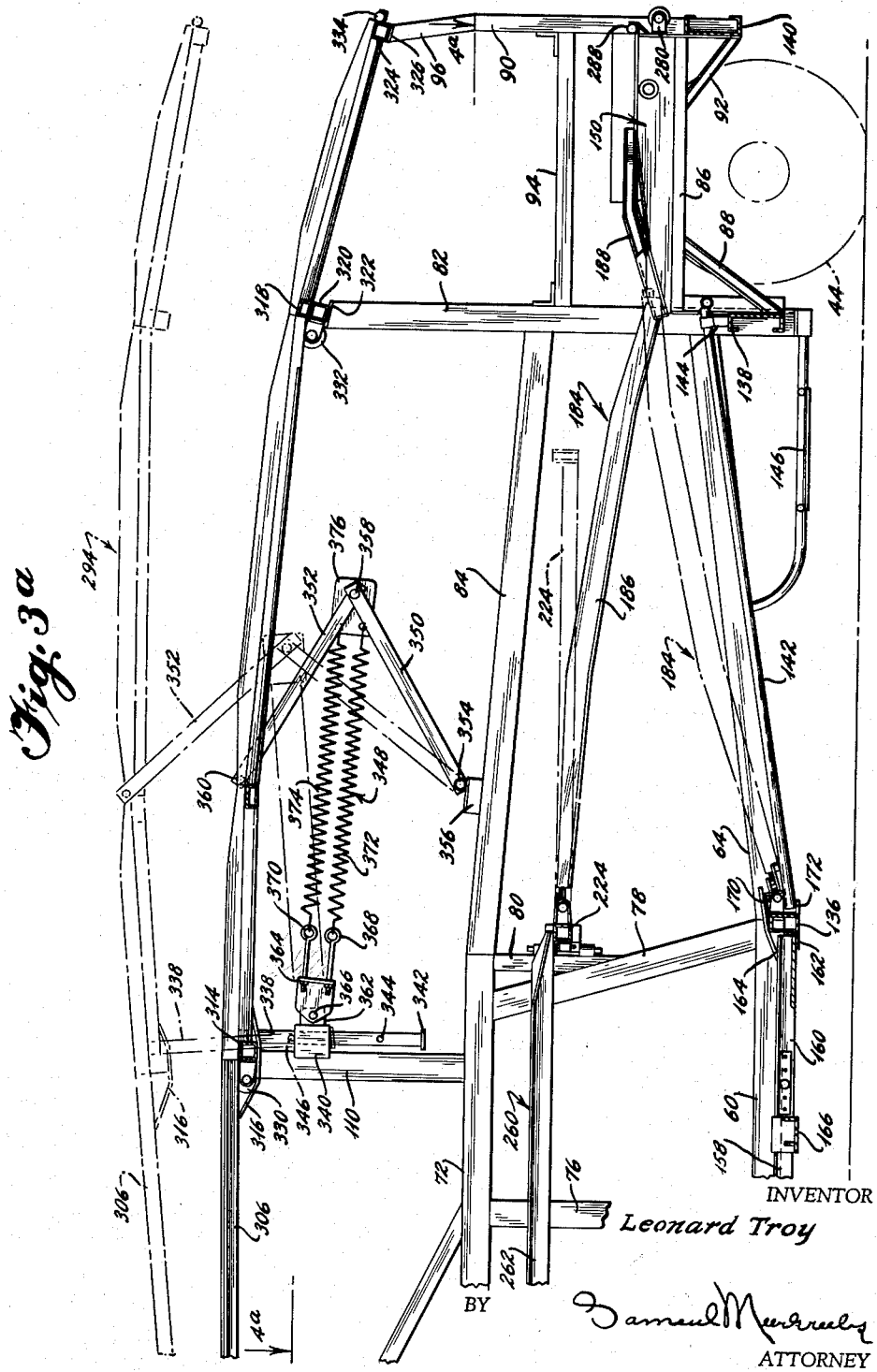

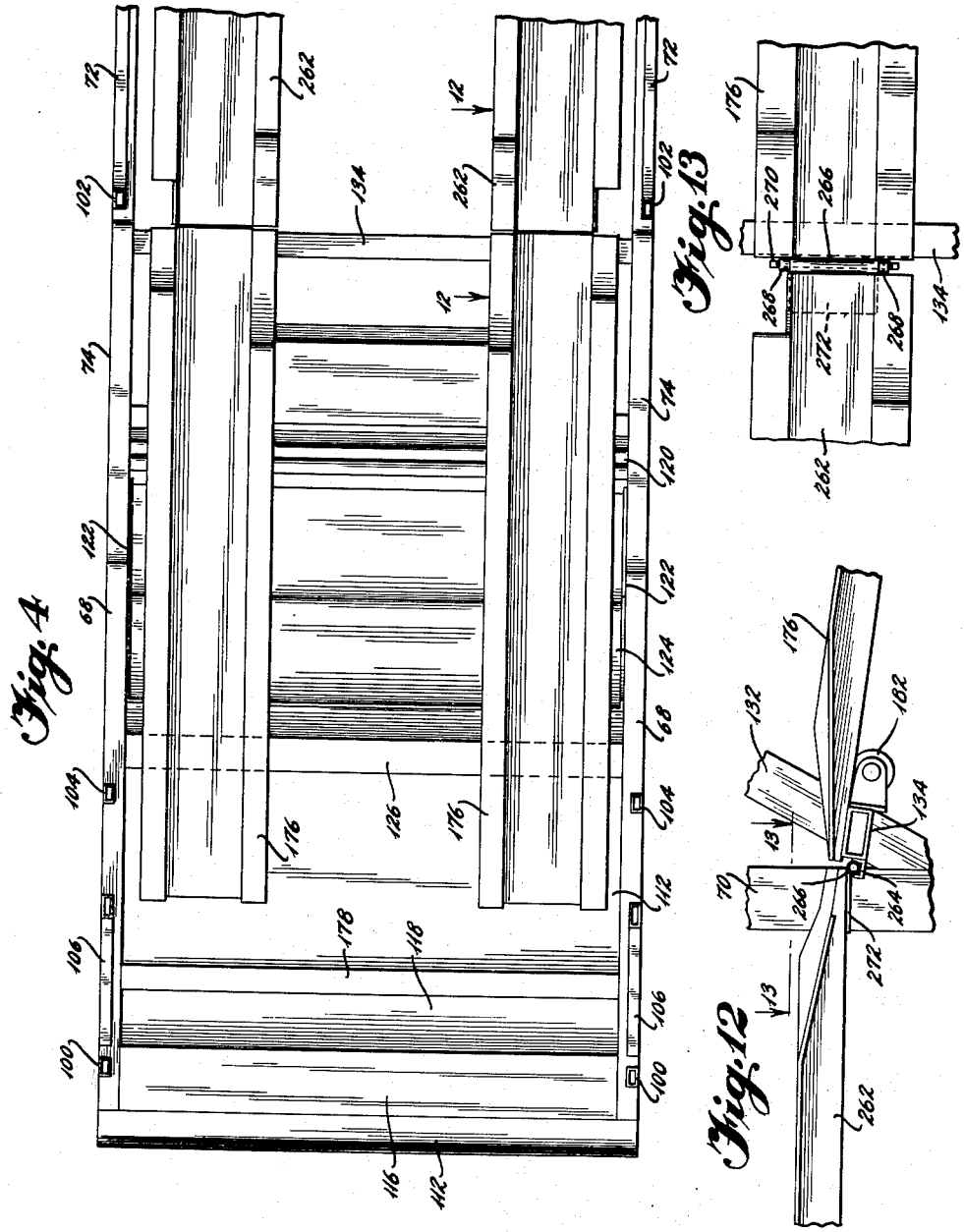
INVENTOR
Leonard Troy
BY
ATTORNEY

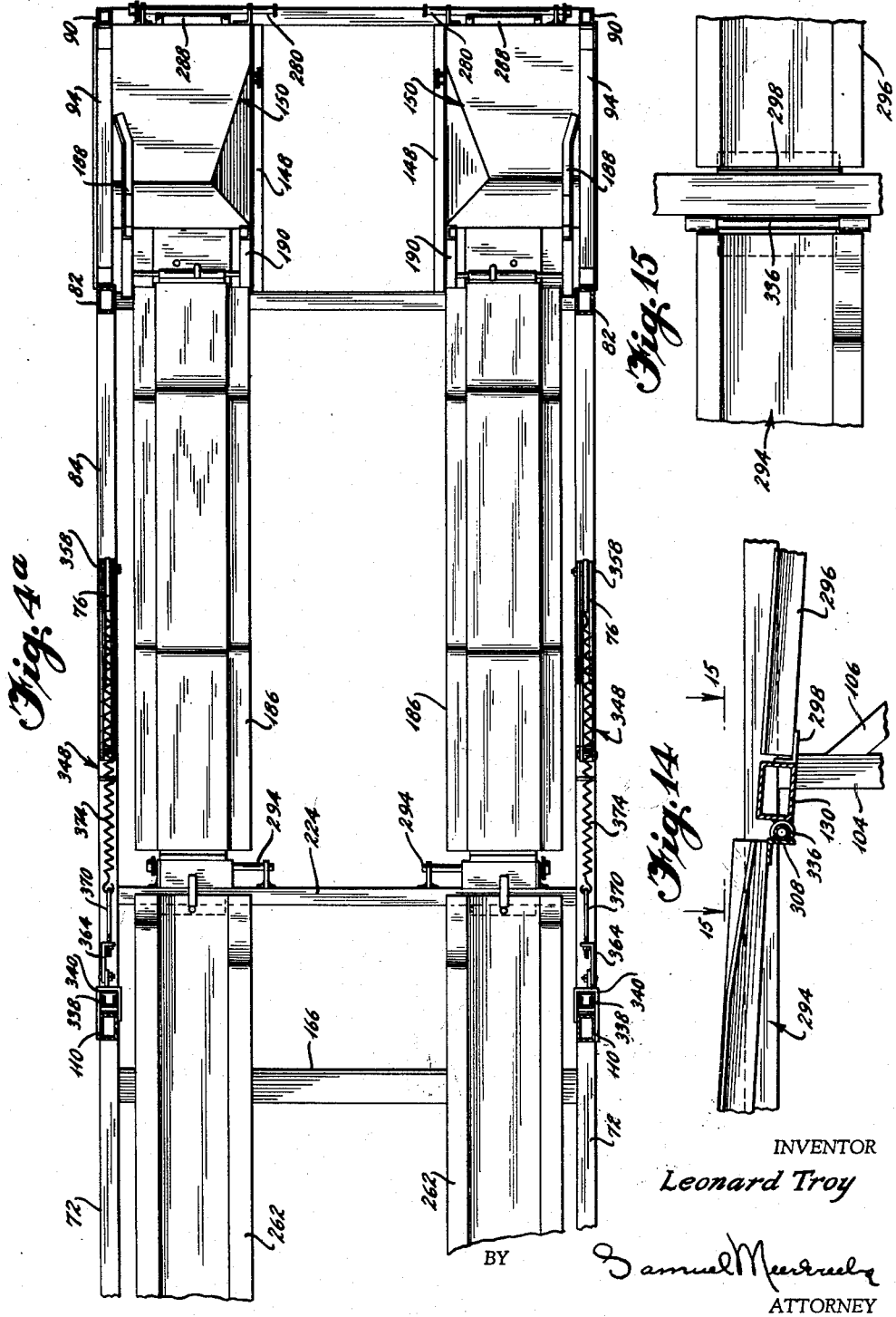

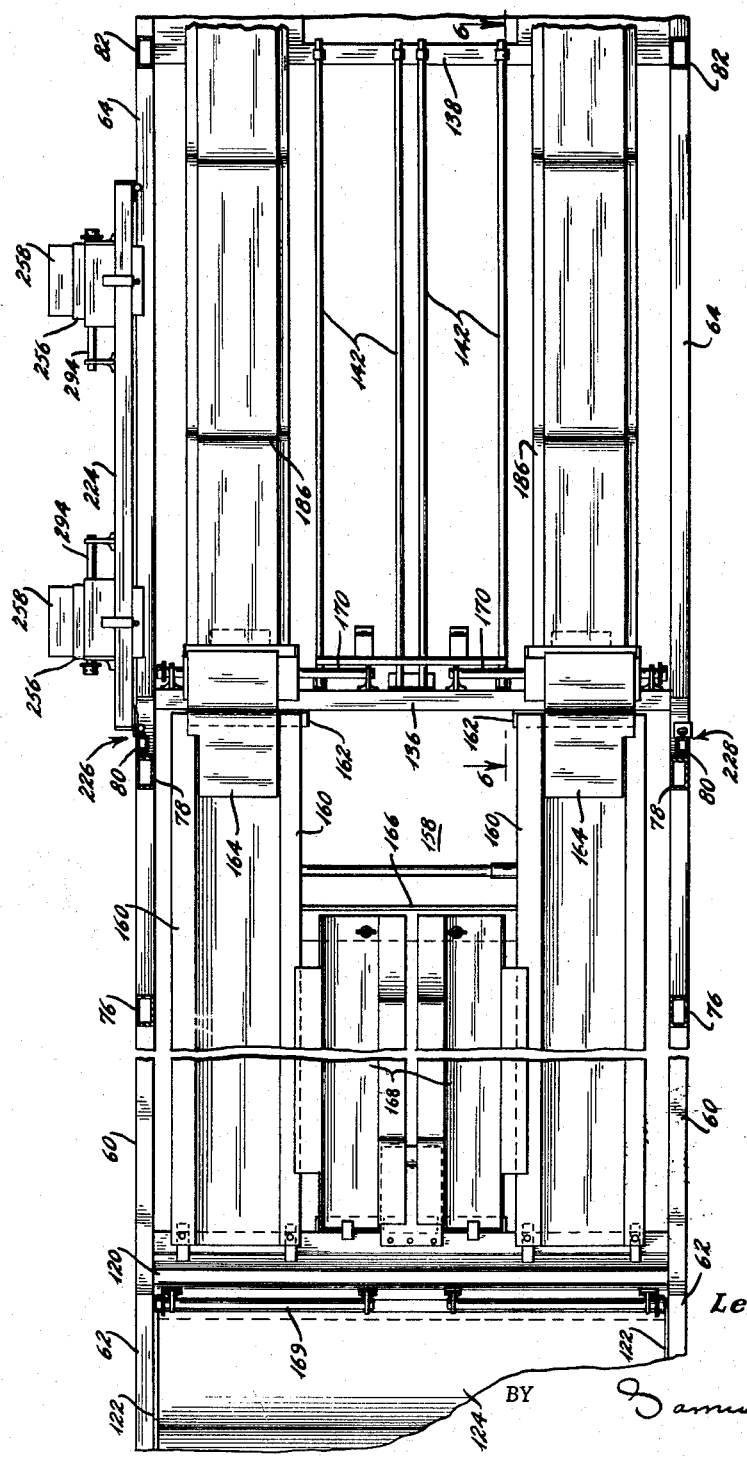

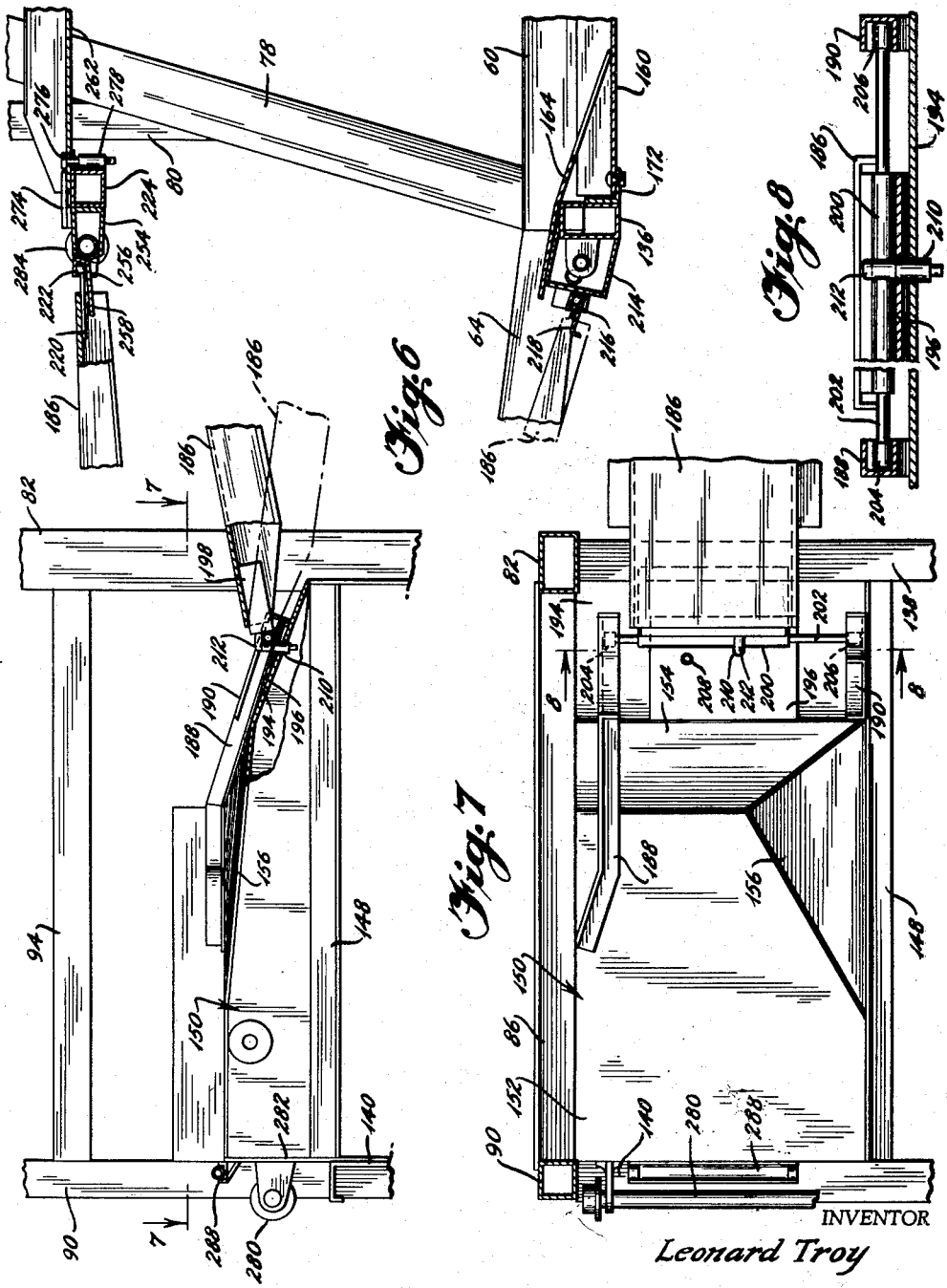

Dec. 10, 1963   L. TROY   3,113,800
AUTOMOBILE TRANSPORT
Filed Jan. 11, 1961   10 Sheets-Sheet 8

INVENTOR
Leonard Troy
BY Samuel Meerkreebz
ATTORNEY

Dec. 10, 1963
L. TROY
3,113,800
AUTOMOBILE TRANSPORT
Filed Jan. 11, 1961
10 Sheets-Sheet 9
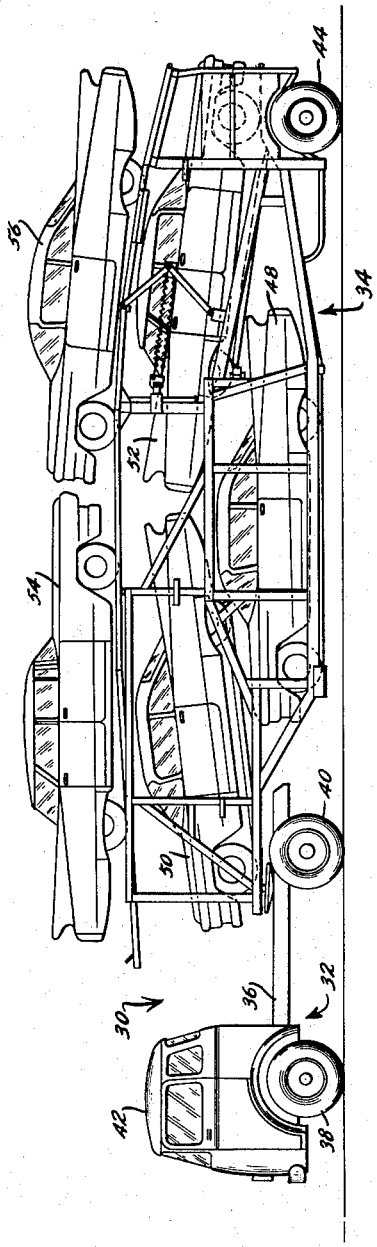
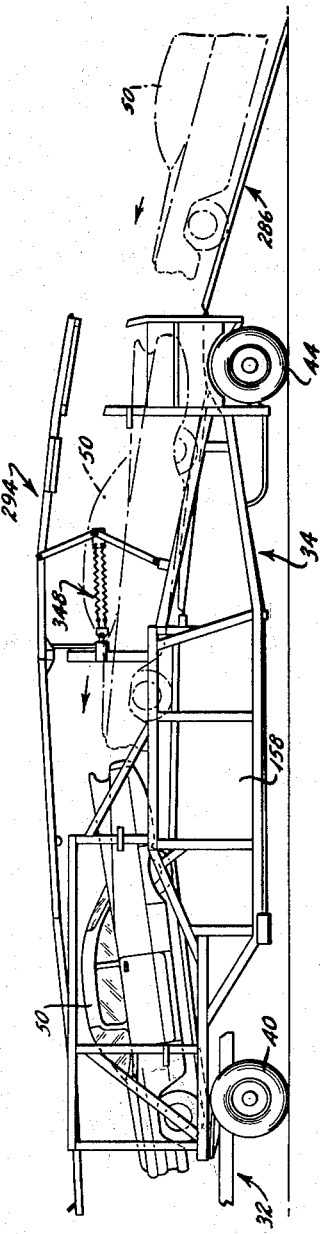
INVENTOR
*Leonard Troy*
BY
ATTORNEY Dec. 10, 1963     L. TROY     3,113,800
AUTOMOBILE TRANSPORT
Filed Jan. 11, 1961     10 Sheets-Sheet 10
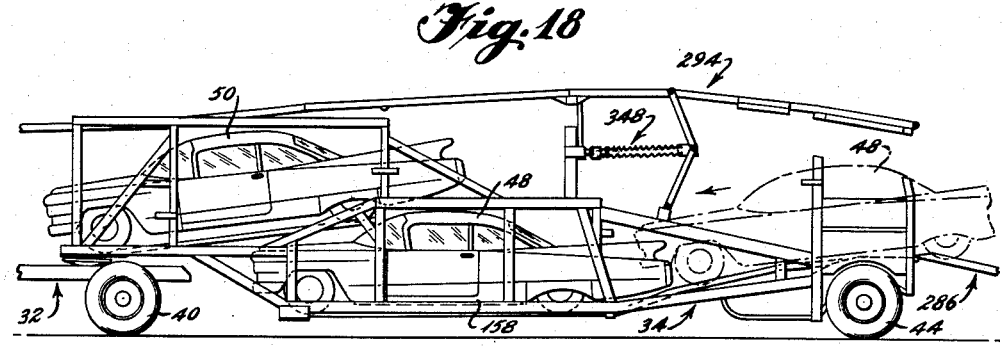
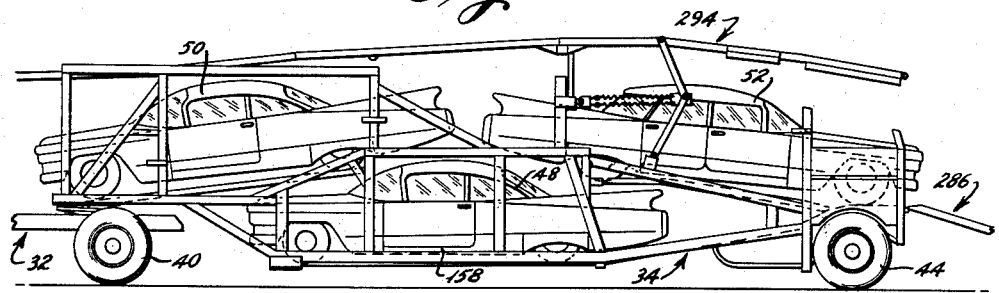
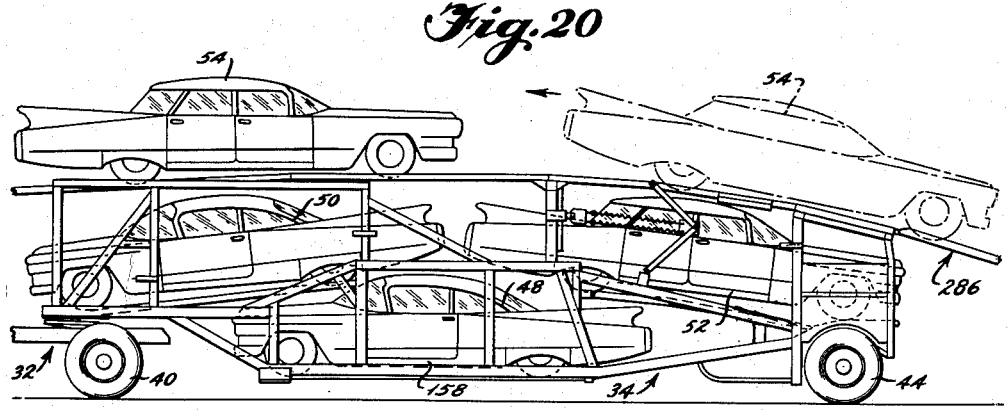
INVENTOR
*Leonard Troy*
BY    *Samuel Meerveld*
ATTORNEY

United States Patent Office 3,113,800
Patented Dec. 10, 1963

3,113,800
AUTOMOBILE TRANSPORT
Leonard Troy, Glenn and Meylert Sts., Scranton, Pa.
Filed Jan. 11, 1961, Ser. No. 82,081
11 Claims. (Cl. 296—1)

This invention relates in general to new and useful improvements in cargo carriers, and more specifically to a novel automobile transport.

As a general rule, in the transportation business, the greater the cargo, the less the unit hauling rate. At the present time, due to length and axle loading restrictions in many of the states, particularly the eastern states, automobile transports are limited to hauling four full size American automobiles. It is readily apparent that if an automobile transport could be provided for carrying five full size American automobiles, including the larger ones manufactured, there would be a definite decrease in hauling costs per automobile. It is to this end that the present invention relates.

In designing tractor-trailer units for transporting automobiles, three considerations must be carefully given. The first of these is the over-all height of the transport, including the automobiles disposed thereon. This is necessary to clear overhead obstructions, such as bridges and the like. The second consideration must be given to the weight of the vehicle, and more particularly to the wheel loading or axle loading. Many states require that each axle of a vehicle not carry over a prescribed weight. Many states are very rigid in this and have weighing stations where each and every truck passing must be weighed. The third of these considerations is the over-all length of the entire transport. This must be held within a prescribed maximum.

In order to maintain as low as possible height, it has been proposed to provide a trailer for transporting automobiles which has a central well which depends between the rear wheels of the tractor and the rear wheels of the trailer. By properly constructing this well to have the necessary road clearance and properly supporting two other vehicles above the well for a portion of their lengths, three vehicles may be accommodated where normally only two vehicles are presently accommodated.

Another object of the invention is to provide a novel manner of loading a trailer for transporting automobiles, the trailer being of a construction wherein a first automobile may be placed in a centrally located well, and the next upper two automobiles may be disposed in rear bumper-to-rear bumper relation so that the overhang of the vehicles will overhang the roof of the lowermost vehicle, and then two other vehicles may be loaded on the usual top ramp or support in overlying relation to the second and third vehicles wherein five vehicles may be carried by a trailer with the over-all height of the trailer loaded with vehicles being within the prescribed maximum.

Another object of the invention is to provide a novel method of loading a trailer for transporting automobiles wherein the axle loading on both the rear axle of the tractor for the trailer and on the rear axle of the trailer is substantially equal so as to prevent an over-the-maximum axle loading on either the tractor or the trailer.

Another object of the invention is to provide a novel trailer for transporting automobiles which is of a configuration wherein five vehicles may be positioned therein and thereon in the total length normally occupied by four vehicles, as is the case in the usual automobile transport.

Still another object of the invention is to provide novel means for loading and unloading an automobile transport which has a lower central well, the means including a jump ramp which is positionable over the well for effecting the loading of a forwardmost automobile forwardly of the well and with a portion thereof projecting over the well wherein in the loading of an automobile transport, a second automobile can be driven into the well partially below the first automobile so as to occupy a minimum of space, both longitudinally and vertically.

Yet another object of the invention is to provide a novel trailer for transporting automobiles which includes in the lower portion thereof a central well and front and rear automobile supports, the front automobile support being fixed and partially overlying the well, there being provided a jump ramp to permit the driving of an automobile onto the front support and thereoff, the jump ramp being supported at its rear end by a transverse beam which is normally in the path of an automobile passing into and out of the well, the transverse beam being a swing beam and being mounted for swinging movement at one end thereof to an out-of-the-way position during the time an automobile is being loaded and unloaded in the well of the trailer.

Still another object of the invention is to provide a novel automobile transporting trailer which has a central well and front and rear automobile supports for supporting second and third automobiles in partial overlying relation to a first automobile disposed within the well, the rear support being used for the movement of an automobile into position on the front support and having a front end thereof temporarily supported at the time of movement of the automobile onto the front support by a transverse beam which is swingable to an out-of-the- way position, and the rear support being swingable downwardly to a lower position for directing an automobile into the well, the rear support being then returnable to its initial elevated position supported by the transverse beam which is now swung back into its normal position, after which the rear support is in position for receiving and supporting an automobile during transport.

A still further object of the invention is to provide a novel rear support for an automobile within an automobile transporting trailer, the rear support having a rear connection which permits longitudinal sliding of the rear support and the swinging thereof between an elevated position and a lowered position, and the trailer being provided with means for supporting the front end of the rear support in both elevated and lowered positions, the means for supporting the front end of the rear support in each instance including a generally channel-shaped rearwardly opening seat into which the forward end of the rear support may be readily slid and from which the forward end of the rear support may be readily removed by longitudinal rearward sliding of the rear support, and the mounting for the rear end of the rear support being a sliding and pivoting one to facilitate the necessary movement of the rear support between its elevated and lowered positions, and there being provided means at the rear end of the rear support for holding the rear support in either of the two positions thereof.

Still another object of the invention is to provide a novel trailer for transporting automobiles, the trailer being provided with a depending central well into which a lowermost vehicle may be positioned, and there being provided upper front and rear supports for other automobiles which will be transported in overlying relation to the automobile within the well, there being provided a jump ramp for effecting the movement of an automobile onto and off of the front support, the jump ramp being normally in the way of an automobile disposed within the well and being readily removable after the positioning of the automobile on the front support to a stored position within the well below the automobile disposed therein.

Yet another object of the invention is to provide in an automobile transporting trailer an uppermost support or ramp for supporting two uppermost automobiles, the uppermost support in lieu of being pivoted at generally the center thereof to facilitate the movement of automobiles into and out of the interior of the trailer, being pivoted adjacent the forward end thereof so that full clearance is provided for moving automobiles into the interior of the trailer and thereby permitting sufficient room for an automobile to be moved over a central ramp which is elevated as compared to the supports for the automobiles within the trailer.

A still further object of the invention is to provide a novel trailer for transporting automobiles, the trailer having automobile supports of a nature wherein a first automobile may be supported in a lowermost position within a well in the trailer, and second and third automobiles may be disposed in partial overlying relation to the first automobile with the second automobile being disposed in rear bumper-to-rear bumper relation, and finally two uppermost automobiles may be positioned above the second and third automobiles in front bumper-to-front bumper relation, the mounting of the automobiles being such as to equally distribute the weights of the automobiles on the rear axle of the tractor for the trailer and the rear axle of the trailer, thereby permitting the transport of greater than normal loads and within the legal weight limits of various States through which the trailer may pass.

With the above, and other objects in view that will hereinafter appear, the nature of the invention will be more clearly understood by reference to the following detailed description, the appended claims and the several views illustrated in the accompanying drawings:

In the drawings:

FIGURE 1 is a plan view of the automobile transporting trailer in accordance with the invention.

FIGURE 2 is an elevational view of the trailer of FIGURE 1, with automobiles shown in position thereon, uppermost portions of the uppermost automobiles being broken away, and the rear portion of an associated tractor being shown in phantom lines.

FIGURES 3 and 3A are combined vertical sectional views of the trailer on a large scale, and together extend the full length of the trailer, the views being taken along the combined section line 3, 3A—3, 3A of FIGURE 1, FIGURE 3 showing the front portion of the trailer and FIGURE 3A showing the rear portion of the trailer, and the uppermost support or ramp being shown in phantom lines while the transverse beam and rear support are shown in position for loading an automobile in the well of the trailer by phantom lines.

FIGURE 4 is a horizontal sectional view on an enlarged scale, taken through the vertical center of the trailer along the line 4—4 of FIGURE 3, and shows generally the details of the front automobile support and the forward end of the jump ramp.

FIGURE 4A is a horizontal sectional view through the vertical center of the rear portion of the trailer, taken along the line 4A—4A of FIGURE 3A, the view also being on an enlarged scale and showing the details of the transverse beam which is a swing beam, the mounting of the rear portions of the jump ramp and the mounting of the rear automobile support or slide ramp.

FIGURE 5 is an enlarged fragmentary horizontal sectional view taken through the lower rear portion of the trailer just above the mounting of the swing beam, and shows the swing beam in its temporary out-of-the-way position and the slide beam in position for delivering an automobile into the well of the trailer.

FIGURE 6 is an enlarged fragmentary vertical sectional view taken along the line 6—6 of FIGURE 5, but with the swing beam in place and the slide ramp in its elevated position, the slide ramp also being shown in its lowered position by phantom lines, and intermediate portions of the slide ramp being omitted.

FIGURE 7 is an enlarged fragmentary horizontal sectional view taken along the line 7—7 of FIGURE 6, and shows the specific details of mounting of the rear end of one of the slide ramp sections wherein the slide ramp section may be moved longitudinally and may be pivoted about a horizontal axis to facilitate the engagement and disengagement thereof with elevated and lowered front supports to permit the positioning of the slide ramp section in either its elevated or lowered position.

FIGURE 8 is an enlarged fragmentary transverse vertical sectional view taken along the line 8—8 of FIGURE 7, and more specifically shows the details of mounting of the rear end of one of the slide ramp sections.

Figure 9:
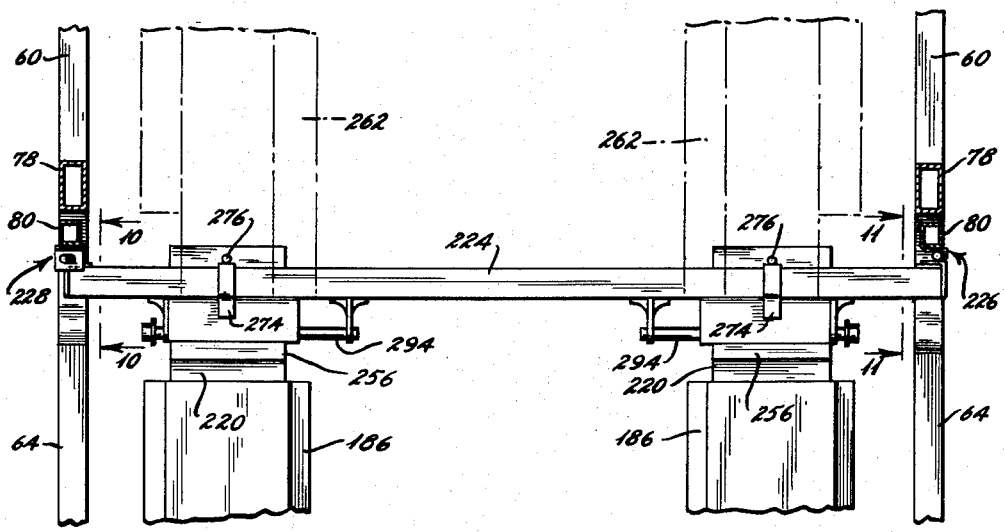

FIGURE 9 is an enlarged fragmentary horizontal sectional view taken through the trailer in the vicinity of the swing beam and in overlying relation to the swing beam, and shows the specific details of the swing beam and the connections between the slide ramp sections and the swing beam and the jump ramp sections and the swing beam, the jump ramp sections being shown in phantom lines.

Figure 10:
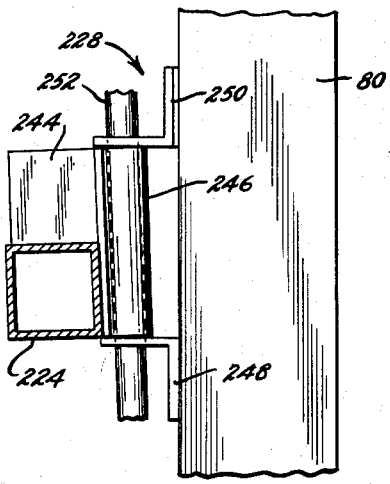

FIGURE 10 is an enlarged fragmentary vertical sectional view taken along the line 10—10 of FIGURE 9, and shows the specific details of the releasable latch for the swing beam which permits the releasing of the swing beam and the swinging thereof to an out-of-the-way position.

Figure 11:
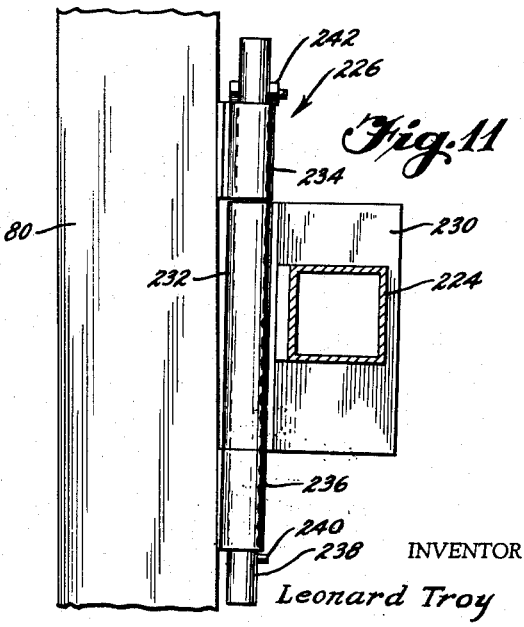

FIGURE 11 is an enlarged fragmentary vertical sectional view taken along the line 11—11 of FIGURE 9, and shows the specific details of the hinge mounting of the opposite end of the swing beam.

FIGURE 12 is an enlarged fragmentary vertical sectional view taken along the line 12—12 of FIGURE 4, and shows the specific details of the mounting of the forward end of the jump ramp, only one of the jump ramp sections being shown.

FIGURE 13 is an enlarged fragmentary horizontal sectional view taken generally along the line 13—13 of FIGURE 12, and shows further the details of mounting of the forward end of one of the jump ramp sections.

FIGURE 14 is an enlarged fragmentary vertical sectional view taken along the line 14—14 of FIGURE 1, and shows the specific details of the hinge connection for one section of the uppermost ramp or automobile support.

FIGURE 15 is a fragmentary horizontal sectional view on an enlarged scale, and shows further the details of the hinge mounting of the forward portion of one of the uppermost ramp sections.

FIGURE 16 is a side elevational view on a reduced scale of the trailer fully loaded with five automobiles and attached to a tractor ready for transportation along the highways.

FIGURE 17 is a side elevational view showing only the rear portion of the tractor and the trailer, with the components thereof adjusted for receiving a first automobile, the automobile being shown in its various positions of movement into the trailer by phantom lines and in its final position by solid lines.

FIGURE 18 is a view similar to FIGURE 17 and shows the trailer with a second automobile disposed within the well of the trailer, the second automobile being shown in its movement into the well by phantom lines.

FIGURE 19 is another fragmentary elevational view similar to FIGURE 17, and shows the trailer loaded with three automobiles.

FIGURE 20 is another view similar to FIGURE 17, and shows a trailer loaded with four automobiles, the fourth automobile being shown in its movement into position on the trailer by phantom lines.

Reference is now made to the drawings in detail, wherein a fully loaded automobile transport in accordance with this invention is illustrated in FIGURE 16, and is generally referred to by the numeral 30. The automobile transport includes a conventional tractor, generally referred to by the numeral 32, and a special trailer, which is the subject of this invention, the trailer being generally referred to by the numeral 34. The tractor 32 has a frame 36 supported by front wheels 38 and rear wheels 40. The tractor 32 also has a cab 42. The trailer 34 has rear wheels 44 and is connected to the tractor 32 by a conventional fifth wheel.

The invention can be best described by describing the intended purpose of the trailer 34. As is clearly shown in FIGURE 16, the trailer 34 is of a construction wherein five of the largest standard automobiles manufactured by American automobile makers can be transported at one time. In order to accomplish this transportation of five large automobiles within the height, length and axle loading regulations of the various states, a first automobile 48 is disposed in a lowermost central position. Another automobile 50 is disposed in an intermediate vertical and forwardmost longitudinal position with the rear portion thereof overhanging the front portion of the automobile 48. An automobile 52 is disposed in the reverse position from the automobile 50 and in rear bumper-to-rear bumper relation with respect thereto. Two other automobiles 54 and 56 are disposed in uppermost positions overlying the automobiles 50 and 52, respectively, but in front-to-rear relation, the automobiles 54 and 56 being in front bumper-to-front bumper relationship, whereas the automobiles 50 and 52 are disposed in rear bumper-to-rear bumper relationship. This arrangement of automobiles permits the five automobiles to be mounted on the trailer 34 occupying the same amount of longitudinal space as is normally occupied by four automobiles. Further, since the automobile 48 is mounted in a lowered central position, the over-all height of the trailer 34, including the automobiles 54 and 56, is generally the same as that in the case of a conventional trailer, and is within the maximum height regulations of the various states. Further, due to the particular front-to-rear mounting of the automobiles 50 and 54 and the automobiles 52 and 56, the weights of the five automobiles carried by the trailer 34 are equally distributed on the rear wheels 40 of the tractor 32 and the rear wheels 44 of the trailer 34, thus providing equal axle loadings, which axle loadings are within the legal limits of the various states.

At this time, it is pointed out that the trailer 34 in many respects is constructed along the general lines of existing trailers. However, the trailer 34 has specific novel features which permit the mounting of the five automobiles illustrated in FIGURE 16 in the desired manner. Accordingly, those details of the trailer 34 which are generally conventional will not be described in detail, the specific description of the details of the trailer 34 being limited to the novel features of the invention.

Reference is now made to FIGURES 3 and 3A, wherein the general details of a side frame of the trailer 34 are illustrated. The trailer 34 will have two of the side frames, with the side frames being generally referred to by the numeral 58. Each of the side frames 58 includes a longitudinal lower frame member 60 which has an upwardly and forwardly sloping forward portion 62 and an upwardly and rearwardly sloping rear portion 64. At the intersection of the main part of the frame member 60 and the forward portion 62, there is an upright 66. A forward horizontal frame member 68 has its rear end connected to the upright 66 adjacent the upper end of the upright 66 and is supported intermediate the ends thereof by the forward end of the portion 62. A second upright 70 is disposed rearwardly of the upright 66 and supports the forward end of a horizontal frame member 72. A diagonal frame member 74 extends from the forward end of the frame member 72 downwardly across the top of the upright 66 and is secured to the rear portion of the frame member 68.

An intermediate portion of the frame member 72 is supported by an upright 76 extending upwardly from an intermediate portion of the frame member 60. A slightly forwardly sloping upright 78 extends upwardly from the intersection of the main portion of the frame member 60 and the rear portion 64 and generally supports the rear part of the frame member 72. A smaller upright 80 extends upwardly from the central portion of the upright 78 and is connected to the frame member 72 at its rear end.

A very high upright 82 is secured to the rear end of the rear portion 64. The upright 82 extends downwardly below its connection with the rear portion 64 of the frame member 60. A slightly downwardly and rearwardly sloping frame member 84 extends from the rear end of the frame member 72 to an intermediate portion of the upright 82.

A relatively short and lighter weight frame member 86 extends rearwardly from the upright 82 opposite the connection between the frame member portion 64 and the upright 82. The forward portion of the frame member 86 is braced by a diagonal brace 88. The rear end of the frame member 86 is connected to an upright 90 which depends below the frame member 86. The frame member 86 is braced at its rear end by a diagonal brace 92. Another frame member 94 extends between the uprights 82 and 90 above the frame member 86. At this time, it is pointed out that the upright 90 has an upwardly and forwardly sloping upper portion 96.

Each side frame 58 also includes an upper longitudinally extending frame member 98. The frame member 98 has its forward end supported by an upright 100 which extends upwardly from the forward portion of the frame member 68. A shorter upright 102 extends upwardly from the forward end of the frame member 72. An intermediate portion of the frame member 98 is supported by an upright 104 and a diagonal brace 106 extends between the frame member 68 and the upright 104. A diagonal brace 108 extends from the upright 102 to the frame member 72. An upright 110, whose purpose will be described in detail hereinafter, extends upwardly from the rear portion of the frame member 72.

A plate 112 extends beneath the frame members 68 and transversely of the trailer 34 at the forward end of the trailer 34, as is best shown in FIGURE 3. The plate 112 carries a fifth wheel pin 114. The plate 112 is reinforced by suitable transverse frame members 116 and 118 which extend between the forward portions of the frame member 68.

A transverse frame member 120 is secured to the underside of the frame members 60 at the forward ends thereof generally in alignment with the upright 66. Suitable supports 122 extend upwardly from the transverse frame member 120 alongside each of the forward portions 62 of the frame members 60 and a front panel 124 is carried by the supports 122. The front panel 124 is connected to the sheet or panel 112 by a sheet formation 126.

The forward portions of the frame members 58 are also connected together by an upper transverse frame member 128 which extends between upper portions of the uprights 100. Another transverse frame member 130 extends generally between the intersections of the upright 104 and the frame members 98.

It is to be noted that a diagonal brace 132 extends generally between the upright 70 and the frame member 74 on each of the side frames 58. A transverse frame member 134 extends between central portions of the diagonal braces 132.

Reference is now made to FIGURE 3A, wherein it will be seen that a transverse frame member 136 extends between the rear ends of the frame members 60 at their intersections with the frame member portions 64. The rear portion of the trailer 34 is connected together by a heavy transverse frame member 138 which extends between the lower ends of the uprights 82. Another heavy transverse frame member 140 extends between the lower ends of the uprights 90.

Although it is not a novel detail of the invention, it will be seen that there is a tie rod 142 which extends between the transverse frame member 136 and a support 144 mounted on the top of the transverse frame member 138. There are a number of these tie rods, as is clearly illustrated in FIGURE 5. A suitable tire carrier 146 is mounted generally beneath the tie rods 142, as is shown in FIGURE 3A.

Reference is now made to FIGURES 6 and 7 in particular, wherein it will be seen that the trailer 34 is provided with a wheel well forming portion for each pair of the dual rear wheel 44 of the trailer 34. A longitudinal frame member 148 is disposed inwardly of the associated frame member 86 and is suitably supported by the transverse frame members 138 and 140. A wheel cover, generally referred to by the numeral 150, is supported by the longitudinal frame members 86 and 148. The wheel cover 150 includes a flat horizontal rear plate 152 which terminates at its forward edge in a downwardly and forwardly sloping transverse plate 154. A triangular plate 156 slopes downwardly and inwardly from the inner forward edge of the plate 152 and from the inner edge of the plate 154.

As is clearly shown in FIGURE 2, the trailer 34 has a lower central well 158 in which the automobile 48 is disposed. In order to facilitate the supporting of the automobile 48, the well 158 is provided with a pair of longitudinally extending ramp sections 160. The forward end of each of the ramp sections 160 is supported on a flange of the transverse frame member 120, as is shown in FIGURE 3. A forward angle member 162 is carried by the transverse frame member 136 and supports the rear end of each of the ramp sections 160. A lead-in plate 164 extends up and out of the rear portion of each of the ramp sections 160 and over the transverse frame member 136. A transverse frame member 166 extends between rear portions of the ramp sections 160 and together with the transverse frame member 120 serves to support suitable drip pans 168, as is best shown in FIGURE 5.

In order to facilitate the retention of the automobile 48 within the well 158 and on the ramp sections 160, the transverse frame member 120 is provided with a suitable ratchet hold-down 169 of a conventional type. Another ratchet hold-down 170, also of a conventional type, is carried by an angle member 172 secured to the transverse frame member 136. The angle member 172 may be interrupted and formed in two transverse sections.

The trailer 34 is provided with a front support, generally referred to by the numeral 174. The front support 174 is formed of two ramp sections 176 which are identical, and which have their rear ends supported by the transverse frame member 134. Forward portions of the ramp sections 176 are supported by a sheet metal formation 126 which also functions as a beam. The forward ends of the ramp sections 176 terminate in overlying relation to the plate 112, and a transverse wheel stop 178 which is part of the transverse frame member 118 also overlies the plate 112. In order to retain an automobile, such as the automobile 50, in position on the front support 174, a conventional ratchet hold-down 180 is carried by the transverse frame member 116. Another conventional ratchet hold-down 182 is carried by the transverse frame member 134. At this time, it is pointed out that each ratchet hold-down may be formed in two parts.

Access to both the well 158 and the ramp sections 160 disposed therein and to the ramp sections 176 of the front support 174 is had by means of a rear support or slide ramp, generally referred to by the numeral 184. The slide ramp 184 is formed of two sections, each of which is referred to by the numeral 186. Each slide ramp section 186 is carried by an associated one of the wheel covers 150. A first guideway 188 is secured to the wheel cover 150 alongside the associated frame member 86. A second and shorter guideway 190 is secured to a forward plate portion 194 of the wheel cover 150 alongside the longitudinal frame member 148. It is to be noted that the forward portions of the guideways 188 and 190 are elevated with respect to the plate 194 and a narrower plate, aligned with the respective one of the slide ramps 186, overlies a portion of the plate 194. This narrow plate is referred to by the numeral 196 and has the same surface elevations as the surface elevations of the guideways 188 and 190.

The rear end of each of the slide ramp sections 186 is provided an extension 198 to which there is connected a sleeve 200. A shaft 202 extends through the sleeve 200 and is provided at its ends with rollers 204 and 206. The roller 204 is positioned in the guideway 188 while the roller 206 is positioned in the guideway 190. It will thus be apparent that each slide ramp section 186 is mounted at its rear end for longitudinal sliding or rolling movement and for pivotal movement. In order to limit the rearward movement of each of the slide ramp sections 186, the plate 196 is provided with two openings 208 and 210 into which a retaining member 212 is selectively positioned. The purpose of these two openings 208 and 210 will be apparent hereinafter.

Reference is now made to FIGURE 6 in particular, wherein it will be seen that the angle members 172 are terminated at the ends of the transverse frame member 136 and replaced by channel members 214. Each of the channel members 214 is provided with an upwardly and rearwardly facing seat 216 which is formed by a channel member having an elongated lower flange 218 which defines a guideway for the seat. The forward end of each slide ramp section 186 is provided with an extension 220 having a transverse rod 222 at the forward end thereof. The rod 222 acts as a skid for the slide ramp section 186. When it is desired to drive the automobile 48 either into the well 158 or out thereof, the slide ramp sections 186 are disposed in their phantom line positions of FIGURES 3A and 6. The extensions 220 and the rods 222 thereof are disposed in the sockets or seats 216. The rods 222 facilitate the sliding of the slide ramp sections 186 along the channel extensions 218. When the slide ramp sections 186 are in their lower positions, the retaining member 212 is positioned in the opening 208. The retaining member 212 prevents the rearward movement of each slide ramp section 186 and thus the movement of the extension 220 thereof out of the seat 216. On the other hand, when the retaining member 212 is removed, the slide ramp section 186 associated therewith may be readily slid rearwardly out of engagement with the seat 216.

The forward end of the slide ramp 184 is supported by a transverse swing beam 224. As is best illustrated in FIGURE 9, the swing beam 224 extends between and is supported by the short uprights 80. The right hand end of the swing beam 224, as viewed in FIGURE 9, is provided with a hinge assembly, generally referred to by the numeral 226. The left hand end of the swing beam 224 is supported by a latch assembly, generally referred to by the numeral 228.

Reference is now made to FIGURE 11 in particular, wherein the details of the hinge assembly 226 are illustrated. An angle member 230 is secured to the end of the swing beam 224. The angle member 230 supports a generally vertical sleeve 232 alongside the associated end of the swing beam 224. The sleeve 232 is aligned with an upper sleeve 234 and a lower sleeve 236 which are secured to the associated upright 80. A hinge pin 238 extends through the sleeves 232, 234 and 236. A stop member 240 in the lower portion of the hinge pin 238 prevents the accidental upward movement thereof, and another stop member 242 prevents the downward movement and loss of the hinge pin 238. It is to be noted that the axis of the hinge pin 240 slopes upwardly and away from the vertical axis of the upright 80, thus to effect the upward and outward swinging of the swing beam 224 when it is swung from a transverse position across the trailer 34 to a generally longitudinal position at one side of the trailer and out of the way of the interior of the trailer, as is shown in FIGURE 5.

Referring now to FIGURE 10, it will be seen that the latch assembly 228 also includes an angle member 244 which is secured to the associated end of the swing beam 224. A sleeve 246 is secured to the angle member 244 alongside the swing beam 224. A pair of angle members 248 and 250 are secured to the upright 80 and receive a latch pin 252 which also extends through the sleeve 246 to latch the swing beam 224 in a transverse supporting position.

As is best shown in FIGURES 6 and 9, the swing beam 224 is provided with a pair of back shape members 254 which are disposed in alignment with the slide ramp sections 186. A seat 256 which corresponds generally to the seat 216 extends rearwardly from each of the back shape members 254. Each seat 256 is formed of a generally channel-shaped member having an extension 258 along which the associated rod 222 may ride in moving the extension 220 of the associated slide ramp section 186 into the seat 256. When the slide ramp sections 186 are in their elevated positions of FIGURE 6, the retaining members 212 are in the openings 210 to prevent the rearward movement of the slide ramp sections 186.

Movement of an automobile across the well 158 is accomplished by means of a jump ramp, generally referred to by the numeral 260 and best illustrated in FIGURES 3 and 3A. The jump ramp 260 is formed of two jump ramp sections 262 with the forward ends of the jump ramp sections 262 being supported on the transverse frame member 134, and the rear ends of the jump ramp sections 262 being supported on the swing beam 224.

Reference is now made to FIGURES 12 and 13, wherein it will be seen that the rear face of the transverse frame member 134 is provided with an upwardly opening seat 264 into which a sleeve 266 of an associated jump beam section 262 is releasably positioned. A pair of short sleeves 268 are disposed at opposite ends of the seat 264 and a removable pin 270 extends through the sleeves 266 and 268 to retain the forward end of each jump beam section 262 in the seat 264. The sleeve 266 is carried by an extension 272 secured to the underside of its respective jump beam section 262. At this time, it is pointed out that each jump beam section 262 has its forward end aligned with an associated ramp 176 of the front support 174.

Reference is now made to FIGURE 6 in particular, wherein it will be seen that the forward end of each jump ramp section 262 slides beneath a strap 274 carried by the swing beam 224. The jump ramp section 262 is held against longitudinal movement by a pin 276 which passes through the jump ramp section 262 and down through a sleeve 278 carried by the swing beam 224.

In loading of the trailer 34, as is best shown in FIGURE 17, the automobile 50 is first loaded into the trailer 34. When the automobile 50 is loaded, the slide ramp 184 is in its uppermost position, and the jump ramp 260 is in place. After the automobile 50 has been loaded, the jump ramp sections 262 are removed by removing the pins 276 holding them in place, then lifting the forward ends thereof out of the seats 264 after the pins 270 are removed, after which they may be slid forwardly out from under the straps 274. The jump ramp sections 262 may then be readily stored in the lower portion of the well 158.

The retaining members 212 for the slide ramp sections 186 are then removed and each slide ramp section 186 is first slid rearwardly until it is disengaged from the associated seat 256, after which it is lowered and engaged with the associated seat 216 in the manner shown in FIGURE 6. The retaining members 212 are then placed in the openings 208. The trailer 34 is now ready to receive the automobile 48 into the well 158, after the swing beam 224 is swung to its out-of-the-way position of FIGURE 5.

After the automobile 48 has been loaded into the well 158, the slide ramp 184 is again returned to its elevated position after the swing beam 224 has been returned to its transverse position. The slide ramp 184 is now ready to receive the automobile 52. At this time, it is pointed out that the automobile 52 is held in place by suitable ratchet hold-downs 280 secured to vertical plates 282 forming parts of the wheel covers 150, as is best shown in FIGURE 6. Other ratchet hold-downs 284 are carried by the swing beam 224.

In the loading of the automobiles 48, 50 and 52, a removable ramp, generally referred to by the numeral 286, is used. This ramp is of the conventional type and is not described in detail. However, it is pointed out that the ramp 286 is formed in sections and the upper ends of each of the sections are connected to the trailer 34 in the same manner as are the forward ends of the jump ramp sections 262. A suitable connector 288 is carried by each wheel cover 150, as is shown in FIGURE 6.

The trailer 34 is also provided with an uppermost support or ramp, generally referred to by the numeral 290, for supporting the automobiles 54 and 56. The uppermost ramp 290 includes a relatively short fixed forward portion, generally referred to by the numeral 292, and a pivotally mounted elongated rear portion, generally referred to by the numeral 294.

The forward portion 292 of the ramp 290 includes a pair of ramp sections 296. Each ramp section 296 has its rear end supported on a short angle member 298 carried by the transverse frame member 130. A forward portion of each of the ramp sections 296 is supported by the transverse frame member 128 and is braced by a brace member 300. The forward end of each of the ramp sections 296 is provided with a suitable wheel stop 302, and a ratchet type hold-down 304 is carried by the transverse frame member 128.

The elongated ramp portion 294 is formed of a pair of ramp sections 306. The ramp sections 306 are generally curved, being formed of a plurality of individual ramp elements which are suitably welded together in slight angular relation. The forward ends of the ramp sections 306 are connected together by a transverse frame member 308. Another transverse frame member 310 extends between the ramp sections 306 generally in alignment with the rear ends of the frame members 98. It is to be noted that the transverse frame member 310 has rounded seat portions 312 for engagement with the frame members 98.

Reference is now made to FIGURE 3A, wherein it will be seen that the ramp sections 306 are connected together generally in alignment with the uprights 110 by a transverse frame member 314. A generally U-shaped strap 316 extends around and under each end of the transverse frame member 314, the strap 316 being intended to be seated on the upper end of an associated one of the uprights 110. A transverse frame member 318 extends between the ramp sections 306 generally in alignment with the uprights 82. Another transverse frame member 320 underlies the transverse frame member 318 for engagement with a cap 322 formed on the upper end of each of the uprights 82. The rear ends of the ramp sections 306 are also connected together by a transverse frame member 324 which is seated on caps 326 formed on the upper ends of the upright portions 96.

In order to hold the automobile 54 in place, in addition to the ratchet hold-down 304, there is provided a ratchet hold-down 328. The ratchet hold-down 328 is carried by the rear ramp portion 294 forwardly of the transverse frame member 310. The automobile 56 is held in place by a ratchet type hold-down 330 carried by the transverse frame member 314 and a ratchet hold-down 332 carried by the transverse frame member 320.

It is to be understood that suitable latch means will be provided for holding the rear ramp portion 294 in its lowered solid line position of FIGURES 3 and 3A for supporting the automobiles 54 and 56. A suitable fitting 334, which is similar to the fitting 288, is carried by each end of the transverse frame member 324 for receiving the upper ends of the ramp sections of the ramp 286, the ramp 286 being elongated at this time due to the extra height of that portion of the trailer which is being loaded.

It will be readily apparent that components of the upper ramp 290 are in the way of the automobiles 48, 50 and 52 as they are being lowered into the lower portion of the trailer 34. It is for this reason that the rear portion 294 of the upper ramp 290 is pivotally mounted in a manner to be described in detail hereinafter.

Reference is now made to FIGURE 3 in particular, wherein it will be seen that a hinge 336 is disposed between the transverse frame member 308 and the transverse frame member 130. It is about this hinge that the rear ramp portion 294 hinges for upward swinging movement between its solid line position of FIGURES 3 and 3A to its phantom line position. The rear ramp portion 294 is held in its upper position by a pair of supports 338 which extend through sleeves 340 carried by the uprights 310. The supports 338 are secured to the transverse frame member 314 in depending relation and are provided at their lower ends with flanges 342 to limit the upward swinging movement of the rear ramp portion 294. Each of the supports 338 is provided with an opening 344 for receiving a pin 346 which engages the upper end of its associated sleeve 340 to prevent accidental downward movement of the rear ramp portion 294 during the loading and unloading of automobiles from the interior of the trailer 34.

Although the rear ramp portion 294, like the remainder of the trailer 34, is formed of light weight metal, such as aluminum, in order to facilitate the raising thereof, there is provided a counterbalanced lift mechanism, generally referred to by the numeral 348. The lift mechanism 348 includes a pair of links 350 and 352 disposed at each side of the trailer. The link 350 is pivotally mounted at its lower end by a pivot pin 354 carried by a bracket 356 secured to a respective one of the frame members 84. The upper end of the link 350 is pivotally connected to the lower end of the link 352 by the pivot pin 358. The upper end of each link 352 is pivotally connected to its associated ramp section 306 by means of a pivot pin 360.

The sleeve 340 at each side of the trailer is provided with a rearwardly directed extension 362 to which there is pivotally mounted a bracket 364 by means of a pivot pin 366. A pair of I-bolts 368 and 370 are carried by the bracket 364 and extend rearwardly therefrom. The forward ends of coil springs 372 and 374, respectively, are connected to eyes of the bolts 368 and 370. A plate 376 is carried by each of the pivot pins 358 and has the rear ends of the coil springs 372 and 374 connected thereto. It is to be understood that the coil springs 372 and 374 are sufficient tension to react upon the links 350 and 352 to counterbalance the weight of the rear ramp portion 294. Adjustment of the tension of the springs 372 and 374 may be had through adjustment of the bolts 368 and 370 relative to the bracket 364.

The manner in which the automobiles 48, 50 and 52 are loaded has been described hereinbefore. It is to be understood that during the loading of these automobiles, it is necessary that the rear ramp portion 294 be in its elevated phantom line position of FIGURES 3 and 3A to provide the necessary clearance. After the automobiles 48, 50 and 52 have been loaded, the rear ramp portion 294 is lowered to its solid line position of FIGURES 3 and 3A and latched in this position, after which the automobiles 54 and 56 are driven thereonto. It is to be understood that the automobiles carried by the trailer 34 are to be unloaded therefrom in reverse order from their order of loading.

The various components of the trailer 34 are dimensioned and positioned to receive the automobile 48 with its front end directed forwardmost. The automobiles 50 and 52 are disposed in rear bumper-to-rear bumper relation, and the automobiles 54 and 56 are disposed in front bumper-to-front bumper relation. Thus, the automobile 54 is disposed in front-to-rear relationship with respect to the automobile 50, and the automobile 56 is disposed in front-to-rear relationship with respect to the automobile 52. By so arranging the automobiles, it will be readily apparent that the load of the five automobiles carried by the trailer 34 is equally distributed upon the rear wheels 40 of the tractor 32 and the rear wheels 44 of the trailer 34. In this manner, a maximum wheel loading may be obtained while still complying with the regulations of various states. Further, since it is possible to mount the automobiles 50 and 52 in bumper-to-bumper relation and the automobiles 54 and 56 in bumper-to-bumper relation, it will be readily apparent that the over-all length of the tractor-trailer assembly which forms the automobile transport 30 may be held at a minimum to comply with state regulations as to the maximum length of vehicles. In addition, although the trailer 34 will hold five automobiles which may be the largest standard automobiles manufactured in the United States, by placing the automobile 48 within the well 158, there is little or substantially no increase in over-all height of the loaded trailer.

From the foregoing, it will be readily apparent that there has been devised a novel trailer construction which, due to the novel features thereof, permits the transporting of five large standard make American automobiles in lieu of the customary four. It will also be readily apparent that the five automobiles may be readily loaded and unloaded relative to the trailer with a minimum of effort on the part of the operator of the trailer.

From the foregoing, it will be seen that novel and advantageous provision has been made for carrying out the desired end. However, attention is directed to the fact that variations may be made in the example trailer construction disclosed herein without departing from the spirit and scope of the invention, as defined in the appended claims.

What is claimed as new:

1. A transport for carrying automobiles comprising a central well for receiving a lowermost automobile, front and rear spaced supports partially overlying said central well for supporting front and rear automobiles in partial overlying relation to said central well, removable ramp means extending between said front and rear supports for moving an automobile from said rear support over said central well and onto said front support, said ramp means comprising a ramp, a mount at one end of said ramp supporting said one end for sliding and pivoting movement, and a pair of vertically spaced seats for supporting the other end of said ramp, each of said seats opening in opposed relation to said mount, each of said seats having a lower extension, said ramp second end having a projecting end member selectively releasably slidable along said seat extensions into said seats, and said mount including means locking said ramp against longitudinal movement to retain said projecting end member in a selected one of said seats.

2. The structure of claim 1 wherein said mount includes two opposed guideways, a transverse shaft secured to said ramp one end, and said transverse shaft having end portions seated in said guideway for sliding and pivoting movement.

3. The structure of claim 1 including a transverse beam for supporting ends of said ramp means, said beam including one of said vertically spaced seats and being in the path of movement of automobiles into and out of the trailer in the ramp supporting position of said beam, means pivotally mounting one end of said beam for swinging about an axis inclined to the vertical for generally upward and outward swinging movement to an out-of-the-way position at one side of said trailer, and a removable latch pin releasably securing the opposite end of said beam, said pivot means being disposed adjacent the outer plane of said trailer and at one side of said beam to assure the movement of said beam out of the general confines of said trailer.

4. An automobile supporting arrangement for supporting five automobiles to occupy a minimum height and length space in a tractor trailer type of automobile transport wherein said tractor has rear wheels and said trailer has rear wheels, said arrangement including a trailer having a central well disposed between and below the tops of said tractor and trailer rear wheels for receiving a lower automobile, a front support for a front automobile, said front support being sloped downwardly and forwardly from a position partially overlying said well to a position overlying said tractor rear wheels, a rear support for a rear automobile, said rear support sloping downwardly and rearwardly from a position partially overlying said well to a position overlying said trailer rear wheels, and a top support overlying said front and rear supports and said well for receiving two upper automobiles in overlying relation to said front and rear supports, said rear support comprising a ramp, a mount at one end of said ramp supporting said one end for sliding and pivoting movement, and a pair of vertically spaced seats for supporting the other end of said ramp, each of said seats opening in opposed relation to said mount, each of said seats having a lower extension, said ramp second end having a projecting end member selectively releasably slidable along said seat extensions into said seats, and said mount including means locking said ramp against longitudinal movement to retain said projecting end member in a selected one of said seats.

5. The structure of claim 4 wherein said mount includes two opposed guideways, a transverse shaft secured to said ramp one end, and said transverse shaft having end portions seated in said guideway for sliding and pivoting movement.

6. The structure of claim 4 including a transverse beam for supporting ends of said ramp means, said beam including one of said vertically spaced seats and being in the path of movement of automobiles into and out of the trailer in the ramp supporting position of said beam, means pivotally mounting one end of said beam for swinging about an axis inclined to the vertical for generally upward and outward swinging movement to an out-of-the-way position at one side of said trailer, and a removable latch pin releasably securing the opposite end of said beam, said pivot means being disposed adjacent the outer plane of said trailer and at one side of said beam to assure the movement of said beam out of the general confines of said trailer.

7. The structure of claim 4 wherein said top support has a hinged connection adjacent the forward end thereof whereby substantially all of said top support may be swung upwardly to clear automobiles being placed on and removed from said front and rear supports.

8. The structure of claim 7 including a spring loaded counterbalance lift mechanism connected to a rear portion of said top support for facilitating manual swinging of said top support.

9. A ramp structure for use in a vehicle transport comprising a ramp, a mount at one end of said ramp supporting said one end for sliding and pivoting movement, and a pair of vertically spaced seats for supporting the other end of said ramp, each of said seats opening in opposed relation to said mount, each of said seats having a lower extension, said ramp second end having a projecting end member selectively releasably slidable along said seat extensions into said seats, and said mount including means locking said ramp against longitudinal movement to retain said projecting end member in a selected one of said seats.

10. The ramp structure of claim 9 wherein said mount includes two opposed guideways, a transverse shaft secured to said ramp one end, and said transverse shaft having end portions seated in said guideway for sliding and pivoting movement.

11. In an automobile transporting trailer, a transverse beam for supporting ends of automobile supporting ramps, said beam being in the path of movement of automobiles into and out of the trailer in the ramp supporting position of said beam, means pivotally mounting one end of said beam for swinging about an axis inclined to the vertical for generally upward and outward swinging movement to an out-of-the-way position at one side of said trailer, and a removable latch pin releasably securing the opposite end of said beam, said pivot means being disposed adjacent the outer plane of said trailer and at one side of said beam to assure the movement of said beam out of the general confines of said trailer.

References Cited in the file of this patent

UNITED STATES PATENTS

| | | |
|---|---|---|
| 2,103,669 | Francis | Dec. 28, 1937 |
| 2,119,671 | Francis | June 7, 1938 |
| 2,583,734 | Francis | Jan. 29, 1952 |
| 2,610,891 | Crockett | Sept. 16, 1952 |
| 2,684,264 | Demos | July 20, 1954 |
| 2,695,810 | Demos | Nov. 30, 1954 |
| 2,878,052 | Stuart | Mar. 17, 1959 |
| 2,892,656 | Stuart | June 30, 1959 |